(12) United States Patent
Seigel et al.

(10) Patent No.: US 9,923,856 B2
(45) Date of Patent: Mar. 20, 2018

(54) DEPUTIZING AGENTS TO REDUCE A VOLUME OF EVENT LOGS SENT TO A COORDINATOR

(71) Applicant: QUEST SOFTWARE INC., Aliso Viejo, CA (US)

(72) Inventors: Jake Seigel, Halifax (CA); Derek Alfred Jury, Beachville (CA)

(73) Assignee: QUEST SOFTWARE INC., Aliso Viejo, CA (US)

( * ) Notice: Subject to any disclaimer, the term of this patent is extended or adjusted under 35 U.S.C. 154(b) by 214 days.

(21) Appl. No.: 15/018,059

(22) Filed: Feb. 8, 2016

(65) Prior Publication Data
US 2017/0230324 A1   Aug. 10, 2017

(51) Int. Cl.
*H04L 12/24*   (2006.01)
*H04L 12/58*   (2006.01)
*H04L 29/08*   (2006.01)

(52) U.S. Cl.
CPC .............. *H04L 51/26* (2013.01); *H04L 41/06* (2013.01); *H04L 41/0604* (2013.01); *H04L 41/0609* (2013.01); *H04L 51/30* (2013.01); *H04L 67/1097* (2013.01)

(58) Field of Classification Search
CPC . H04L 41/06; H04L 41/0604; H04L 41/0609; H04L 41/0654; H04L 41/069; H04L 41/082; H04L 41/0893; H04L 41/28; H04L 41/509; H04L 51/26; H04L 51/30; H04L 67/1097; H04L 43/10; G06F 11/3476
See application file for complete search history.

(56) References Cited

U.S. PATENT DOCUMENTS

| | | | | |
|---|---|---|---|---|
| 2005/0010929 A1* | 1/2005 | Wang | ................. | G06F 11/3476 719/318 |
| 2007/0222576 A1* | 9/2007 | Miller | ................. | H04L 41/0609 340/506 |
| 2013/0055389 A1* | 2/2013 | Alvarez | ................. | H04L 41/28 726/22 |
| 2014/0172944 A1* | 6/2014 | Newton | ............. | H04L 41/0893 709/202 |
| 2014/0344452 A1* | 11/2014 | Lipstone | ............... | H04L 41/509 709/224 |
| 2014/0379895 A1* | 12/2014 | Jain | ..................... | H04L 41/0654 709/224 |
| 2015/0207709 A1* | 7/2015 | Hanckel | ............... | H04L 41/069 709/224 |

(Continued)

*Primary Examiner* — Le H Luu
(74) *Attorney, Agent, or Firm* — Maschoff Brennan

(57) ABSTRACT

Systems and techniques to deputize agents in a system to reduce a number of event logs received by a coordinator are described. An agent belonging to a group of agents may receive a request to select a deputized agent. The agent may determine data associated with a component hosting the agent and send the data to a selection agent. The agent may receive a message from the selection agent indicating that the agent is to be the deputized agent. The deputized agent may receive one or more event logs from other agents in the group, determine that at least one event log has a high priority, and send the at least one event log to the coordinator. The deputized agent may store the one or more event logs in a storage device accessible to the hardware component.

20 Claims, 7 Drawing Sheets

(56) References Cited

U.S. PATENT DOCUMENTS

| | | | |
|---|---|---|---|
| 2015/0263909 A1* | 9/2015 | Okubo | H04L 43/10 709/224 |
| 2016/0183109 A1* | 6/2016 | Kiesekamp | H04L 41/0609 370/252 |
| 2016/0196131 A1* | 7/2016 | Searle | H04L 41/082 717/173 |

* cited by examiner

US 9,923,856 B2

DEPUTIZING AGENTS TO REDUCE A VOLUME OF EVENT LOGS SENT TO A COORDINATOR

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many enterprise software solutions, such as Dell® Change Auditor, use multiple software agents deployed across the enterprise's network to gather data and send the data to a central location. The data may be used by a system administrator to determine the state of the network, to gather information for regulatory compliance (e.g., Sarbanes-Oxley), etc. In such software solutions, large amounts of data may be transmitted across the network, e.g., from the agents to a central coordinator. If a system fault occurs, the system fault may cause the agents to generate a large number of event logs (or other messages), causing the central coordinator to become overloaded. Furthermore, it is not always feasible to load balance every component in a system using virtual machines (VMs). For example, space for VMs may be not available, or the enterprise may have a policy that does not allow for cloud-based VMs.

SUMMARY

This Summary provides a simplified form of concepts that are further described below in the Detailed Description. This Summary is not intended to identify key or essential features and should therefore not be used for determining or limiting the scope of the claimed subject matter.

Systems and techniques to deputize agents in a system to reduce a number of event logs received by a coordinator are described. An agent belonging to a group of agents may receive a request to select a deputized agent. The agent may determine data associated with a component hosting the agent and send the data to a selection agent. The agent may receive a message from the selection agent indicating that the agent is to be the deputized agent. The deputized agent may receive one or more event logs from other agents in the group, determine that at least one event log has a high priority, and send the at least one event log to the coordinator. The deputized agent may store the one or more event logs in a storage device accessible to the hardware component.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
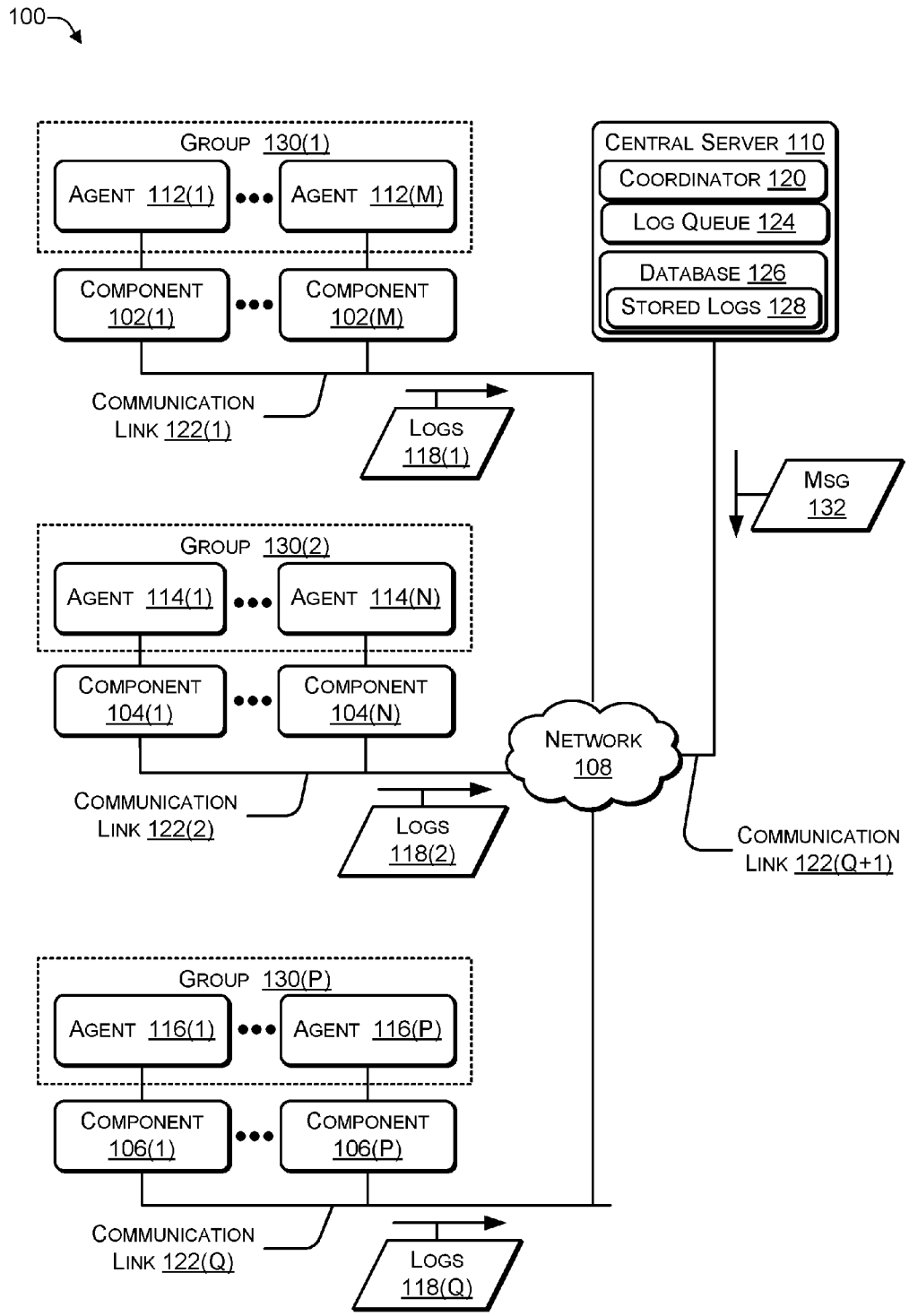
FIG. 1 is a block diagram illustrating a computing system that includes agents to monitor activities and generate event logs according to some examples.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

Enterprise software solutions, such as Dell® Change Auditor, may deploy multiple software agents across the enterprise network to gather data and send the data to a central location. For example, agents may be deployed on computing devices, such as servers and workstations, throughout the enterprise network. The agents may be used to monitor activities occurring in the enterprise network and to generate event logs when events occur, e.g., "username A performed operation B to data C located on server D at time T." For example, the agents may monitor activities associated with Active Directory®, Microsoft® Exchange®, file servers, network-attached storage, SharePoint®, Lync®, structured query language (SQL) Server, etc. The agents may send event logs back to a coordinator (e.g., a software component) that stores the event logs in a database. A user interface may enable a system administrator to graphically view the stored event logs to determine how the network is performing, identify resources (e.g., processing resources, storage resources, communication resources, etc.) that are at or near capacity and may be upgraded, etc.

In some cases, a relatively large amount of activities may occur within a relatively short period of time, causing the agents to generate a large number of event logs over a short period of time. For example, when a script is executed, the script may perform a large amount of activities within a short period of time (e.g., as compared to a user performing the same activities), thereby causing many event logs to be generated in the short period of time. When multiple agents each generate a large number of event logs (e.g., due to multiple scripts being executed substantially at the same time), various types of problems may occur. For example, the large number of event logs being sent to the coordinator may (i) cause the coordinator to become overloaded, (ii) cause communication links to become overloaded resulting in increased latency (e.g., latency is a time period between when an event log is generated and when it is received by an intended recipient), (iii) cause other components in the network to be overloaded or stressed (e.g., storage queues are at or near capacity), other network-related issues, or any combination thereof. To illustrate, the coordinator may be considered overloaded when a time period between when an event log is generated and when the coordinator selects the event log for analysis exceeds a pre-determined threshold. As another illustration, the coordinator may be considered overloaded (i) when a number of event logs in an event log queue exceed a pre-determined threshold, (ii) when an amount of logs in the event log queue is greater than a threshold percentage (e.g., 90%), (iii) when a remaining space in the event log queue is less than a threshold amount (e.g., 10%), or the like.

During situations in which a large number of event logs are generated, the agents may be divided into multiple groups, and an agent in each group that is generating a large number of event logs may be selected as a deputized agent. Other agents in the group (e.g., peer agents of the deputized agent) that would normally send event logs to the coordinator may temporarily send event logs to the deputized agent. The deputized agent may store the event logs (e.g., sent by other agents in the group) in a local database, thereby reducing the amount of event logs that the coordinator receives. The deputized agent may analyze the event logs received from peer agents in the group, identify high priority event logs, and forward the high priority event logs to the coordinator. Thus, the coordinator may continue to receive high priority event logs from the group, without receiving a high volume of lower priority event logs from the group. In addition, the deputized agent may send statistical information associated with the lower priority event logs that are being stored locally to the coordinator. For example, the statistical information may identify how many event logs have been received in a particular period of time, the types of collected events received in the particular period of time, and the like. In this way, the coordinator may be provided with information about the low priority event logs that are being stored locally (e.g., by the deputized agent) and are not being sent to the coordinator. Thus, if a user (e.g., a system administrator) requests information about a lower priority event log from the coordinator, the coordinator can request the lower priority event log from the deputized agent. The deputized agent may send the statistical information in a high priority event log to the coordinator.

After selecting a deputized agent, if the coordinator continues to experience overload, additional agents may be deputized until the coordinator is no longer overloaded. For example, a first deputized agent may be selected from a first group generating a highest number of event logs within a predetermined time period, a second deputized agent may be selected from a second group generating a next highest number of event logs within the predetermined time period, and so on, until the coordinator is no longer overloaded.

If a deputized agent experiences overload, the process of selecting a deputized agent may be recursively applied to the group to which the deputized agent belongs. For example, if a first deputized agent in a first group is experiencing overload, the first group may be sub-divided into multiple sub-groups. One or more of the sub-groups may select a second deputized agent. The second deputized agent may store event logs locally for one sub-group of the multiple sub-groups. This process may be repeated until the deputized agents do not encounter overload.

The coordinator may notify groups to select a deputized agent from among candidate agents (e.g., identified by each group) based on one or more criteria. The criteria may include an available processing capacity associated with a computing device that is hosting (e.g., executing) each candidate agent. For example, agents hosted by a computing device with at least a threshold amount (e.g., 40%, 50%, 60% or the like) of processing capacity may be considered as a candidate to be the deputized agent. The criteria may include an available storage capacity associated with the machine that is hosting each candidate agent because the storage may be used to locally store event logs. The criteria may include a latency of a communication link between the machine that is hosting each candidate agent and a central server that is hosting the coordinator. Information associated with the criteria, such as host processing capacity, host storage capacity, host latency, etc. may be periodically gathered from the agents to enable candidate agents from each group to be quickly analyzed when selecting a deputized agent. In addition, the information may be gathered over a period of time and analyzed to determine which agents are candidates to be the deputized agent.

When a coordinator is overloaded, computing devices hosting non-critical components may be given a lower priority to avoid disruptions to critical services, such as Exchange®, Active Directory®, and the like. For example, a lower priority may be assigned to components that are not time sensitive, such as tasks typically performed in the background. File system access events for non-critical files may be assigned a low priority because such events may generate a large number of non-critical event logs (e.g., file opened event logs, file closed event logs, etc.). SQL server auditing may be assigned a low priority if the hosted data is not of a critical nature. Many event logs that are stored primarily for forensic purposes may be assigned a low priority and stored when computing system resources are available. In contrast, logins performed using active directory may be higher priority as the logins may be used to determine unauthorized accesses etc.

By analyzing event log generation over a period of time (e.g., weeks, months, etc.), groups of agents that have a high likelihood of causing a problem in the future may be identified. For example, particular groups may generate a high volume of event logs during certain times. To illustrate, at the beginning of each month or at the beginning of each quarter, users may run scripts to generate statistics (e.g., sales statistics, etc.) for the previous month or the previous quarter. Running these scripts may cause a large number of event logs to be generated by a group of agents (e.g., agents monitoring databases storing sales information). Each group of agents may be rated based on a likelihood that the group may cause an overload condition. A potential deputized agent may be identified for groups with a high likelihood of causing an overload. When an overload occurs, the groups with higher likelihoods may be sent a request to appoint the previously identified deputized agent, e.g., without the group taking time and resources (e.g., exchanging messages) to identify the deputized agent.

Thus, a coordinator component may divide multiple agents in an enterprise network into multiple groups. When the coordinator encounters overload due to the generation of a large number of event logs, the coordinator may send a request to one or more groups asking the groups to appoint a deputized agent. A deputized agent may be an agent that is (1) not directly contributing to the increase in event logs and (2) hosted by hardware that has sufficient computing resources (e.g., processing power, local storage, fast communication links, etc.) to support a deputized agent.

The coordinator may detect the topology of agents across at least a portion of an enterprise network. In the case of multiple coordinators, each coordinator may receive event logs from a particular (e.g., non-overlapping) portion of the enterprise network. Each coordinator may logically divide the agents into multiple groups based on various criteria. For example, the criteria may include a communication latency between agents in the group, an importance of services hosted by hardware components that host agents (e.g., agents hosted by components with critical or important services, such as Exchange® servers may not be included in a group or may not be grouped together), an amount of event logs generated over a particular period of time by each agent (e.g., to avoid grouping high-generating agents, e.g., agents that generate a large number of event logs, together), computing resources of the hardware components that host each agent (e.g., processing power, hard drive space, installed database components, and the like) to mix higher capability host components with lower capability host components in groups. Each agent may receive a message indicating group information, e.g., the group to which agent belongs, the identities of other agents in the group, etc., to enable each agent to contact peer agents within the group.

When a coordinator reaches an overload state (e.g., event log latency satisfies a threshold, event log queue is at or near capacity or the like), the coordinator (or another software component) may send one or more groups associated with the coordinator an alert message indicating that the coordinator is experiencing overload. Each agent in each group may determine capabilities of the agent's host machine, determine a weighted score based on various criteria, and broadcast the score to other agents in the group. The agent with the highest score in each group may be selected (e.g., by the group) as a deputized agent. The deputized agent may perform actions similar to actions that the coordinator performs in addition to existing agent-related duties. For example, the deputized agent may receive event logs from peers, e.g., other agents in the group to which the deputized agent belongs and store the event logs locally. The deputized agent may analyze the event logs and notify the coordinator as to the occurrence of high priority event logs, etc. The deputized agent may provide the coordinator with statistical data associated with the events being stored locally (e.g., number of events being stored locally, types of events, being stored locally, where the events are being stored locally, and the like). When a system administrator submits an event query, the coordinator may determine that the event query includes event(s) stored locally by a deputized agent and may request the event(s) from the deputized agent. Thus, the system administrator may be unaware that the coordinator is experiencing overload or that one or more agents have been deputized because the coordinator is able to continue to respond to event queries. When the coordinator is no longer in an overload state, e.g., the coordinator has caught up with processing event logs such that the event log queue has less than a threshold percentage of logs, the groups may be alerted. In response, the deputized agents in each group may forward locally stored event logs to the coordinator and return to normal operations (e.g., performing the operations of an agent).

FIG. 1 is a block diagram illustrating a computing system 100 that includes agents to monitor activities and generate event logs according to some examples. The computing system 100 may include different types of components used in a computing system, including a first set of components 102(1) to 102(M), a second set of components 104(1) to 104(N), and a third set of components 106(1) to 106(P) (where N, M, and P>1 and N, M, and P not necessarily equal to each other). For example, the first set of components 102 may include a database server, the second set of components 104 may include user computing devices (e.g., workstations, laptops, or the like), and the third set of components 106 may include various types of servers.

The components 102, 104, and 106 may be coupled via a network 108 to a central server 110. The network 108 may include wired technologies, such as Ethernet, Fiber Optics, and the like, and wireless technologies, such as code division multiple access (CDMA), global system for mobile (GSM), 802.11 (e.g., WiFi®), BlueTooth®, etc.

Multiple agents (e.g., software agents) 112, 114, and 116 may be deployed within the computing system 100 to monitor the components 102, 104, and 106, respectively, and to generate event logs 118 when events associated with the components 102, 104, and 106 occur. For example, each of agents 112(1) to 112(M) may be hosted by and may monitor the components 102(1) to 102(M), respectively. The agents 112 may generate event logs 118(1) when events associated with the components 102 occur. Each of agents 114(1) to 114(N) may be hosted by and may monitor the components 104(1) to 104(N), respectively. The agents 114 may generate event logs 118(2) when events associated with the components 104 occur. Each of agents 116(1) to 116(P) may be hosted by and may monitor the components 106(1) to 106(P), respectively. The agents 116 may generate event logs 118(Q) (where Q>1) when events associated with the components 106 occur. For example, an agent from the agents 112, 114, or 116 may generate an event log each time a component that the agent is monitoring is accessed. To illustrate, when the agent is monitoring a workstation or a server, the agent may generate an event log when a login occurs, when a logout occurs, when the workstation or server is used to access other network components or resources, etc. As another illustration, when the agent is monitoring a database, the agent may generate an event log when data associated with the database is added, deleted, or modified.

The agents 112 may send the logs 118(1) to a coordinator 120 using a communication link 122(1) (e.g., a portion of the network 108). The agents 114 may send the logs 118(2) to the coordinator 120 using a communication link 122(2) (e.g., a portion of the network 108). The agents 116 may send the logs 118(Q) to the coordinator 120 using a communication link 122(Q) (e.g., a portion of the network 108). The central server 110 may be coupled to the network 108 via a communication link 122(Q+1) (e.g., a portion of the network 108).

Each of the event logs 118 may have an associated priority, such as, for example, low priority, medium priority, or high priority. A low priority event log may be associated with a routine event, such as a file being backed up, data being read from a database, etc. A medium priority event log may be associated with a noteworthy event, such as a logon occurring or a user receiving elevated access privileges, etc. A high priority event log may indicate that a component crashed (e.g., restarted or rebooted), a disk drive crashed, a communication link is unavailable, etc. Of course, the three priority levels described in the previous examples are purely for illustration purposes and different implementations may include more than three or fewer than three priority levels. Each event log may identify a component associated with the event that caused the event log to be generated. For example, an event log identifying a logon event may identify a workstation or laptop where a user logged on. As another example, an event log identifying an operation performed to a database may identify the database to which the operation was performed. Each event log may include a timestamp indicating a date and time (e.g., hour, minutes, and seconds) when the event occurred or when the event log was generated by an agent.

The logs 118 sent by the agents 112, 114, and 116 may be placed in a log queue 124 located in a memory of the central server 110. The coordinator 120, hosted by the central server 110, may retrieve an event log from the log queue 124 and determine whether to perform an action based on the event log. For example, the coordinator 120 may display a graphical user interface (GUI) displaying a status of the computing system 100. The GUI may display (1) a green indicator where portions of the computing system 100 are functioning correctly, (2) a yellow indicator where portions of the computing system 100 are functioning correctly but where a problem may occur (e.g., a computing resource is approaching 100% capacity, a communication link is transmitting slowly, etc.) or where further investigation is needed, and a (3) a red indicator where portions of the computing system 100 are not functioning correctly. For example, a low or medium priority event log may cause the coordinator 120 to display a green indicator for a portion of the GUI associated with the component associated with the event log. A medium priority event log identifying that a resource is approaching 100% capacity (e.g., disk is almost full, processing resource is at or near full capacity, etc.) may cause the coordinator 120 to display a yellow indicator for a portion of the GUI associated with the component associated with the event log. A high priority event log identifying that a resource performed a restart or that a resource is unavailable may cause the coordinator 120 to display a red indicator for a portion of the GUI associated with the component associated with the event log.

After the coordinator 120 has retrieved an event log stored in the log queue 124 and examined the contents of the event log, the coordinator 120 may store the event log in a database 126 to create one or more stored logs 128. The coordinator 120 may use machine learning to analyze the stored logs 128 to identify trends, patterns, etc., and to predict potential problems.

The log queue 124 may have a particular capacity, e.g., X kilobytes, Y number of event logs, or the like. The coordinator 120 may be considered overloaded (e.g., in an overload state) when the log queue 124 approaches capacity, e.g., the log queue 124 is greater than a threshold amount full (e.g., 80%, 90%, 95% full or the like), when the log queue 124 has less than a threshold amount of remaining capacity (e.g., 20%, 10%, 5% or the like), when the log queue 124 includes greater than a threshold number of event logs, when a length of time between when an event log was generated (e.g., another measurement of overload, or any combination thereof).

The coordinator 120 may detect a topology of the agents 112, 114, 116 across the computing system 100 to enable the coordinator to create a view of the computing system 100. The coordinator 120 may segment the agents 112, 114, and 116 into multiple groups based on various criteria. For example, the coordinator 120 may group the agents 112 into a first group, e.g., group 130(1), may group the agents 114 into a second group, e.g., group 130(2), and may group the agents 116 into a Pth group, e.g., group 130(P). Of course, other types of groupings are possible, e.g., agents 112(1), 114(1), and 116(1) in a first group, and agents 112(N), 114(N), and 116(N) in an Nth group. For example, the criteria used to group agents may include a communication latency between agents (e.g., agents may be grouped on a latency of communications between agents in a group), an importance of services hosted by hardware components that host the agents (e.g., agents hosted by components with critical or important services, such as Exchange® servers may not be included in a group or may not be grouped together), an amount of event logs generated over a particular period of time by each agent (e.g., to avoid grouping high-generating agents, e.g., agents that generate a large number of event logs, together), computing resources of the hardware components that host each agent (e.g., processing power, hard drive space, installed database components, and the like) to mix higher capability host components with lower capability host components in groups. Each of the agents 112, 114, 116 may receive a message 132 from the coordinator 120 indicating group information, e.g., the group to which agent belongs, the identities of other agents in the group, etc., to enable each agent to contact peer agents within the group. For example, the coordinator 120 may send the message 132 to each of the agents 112(1) to 112(M) indicating that the agents 112 belong to the group 130(1), the coordinator 120 may send a message to each of the agents 114(1) to 114(N) indicating that the agents 114 belong to the group 130(2), and the coordinator 120 may send a message to each of the agents 116(1) to 116(P) indicating that the agents 116 belong to the group 130(P).

Thus, agents may be deployed across an enterprise's computing system to monitor components in the system and to generate event logs when events occur (e.g., when operations are performed to the monitored components). The event logs may be sent via communications links in a network to a central coordinator. The event logs may be stored in a queue. The coordinator may retrieve event logs from the queue, examine information associated with the retrieved event log, such as a priority level, one or more components associated with the event, etc. The coordinator may perform one or more actions based on the retrieved event log, including updating a GUI displaying a status of the computing system. The coordinator may store the event log retrieved from the log queue in a database and delete the event log from the log queue. In this way, the coordinator may display and periodically update a status of the computing system. The coordinator may divide the agents into groups based on more criteria.

Figure 2:
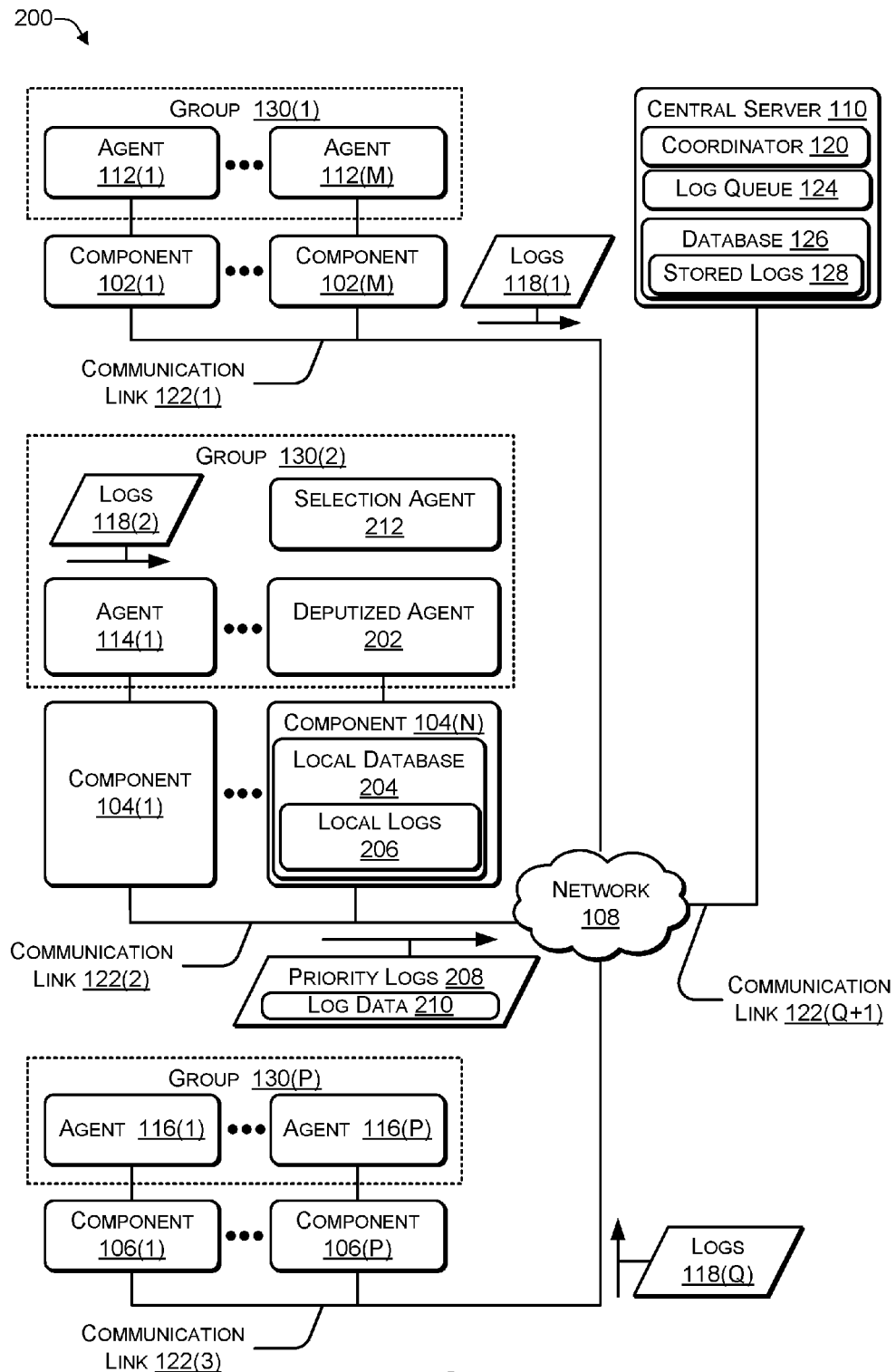
FIG. 2 is a block diagram illustrating a computing system that includes a deputized agent according to some examples.

FIG. 2 is a block diagram illustrating a computing system 200 that includes a deputized agent according to some examples. The computing system 200 may be at least a part of an enterprise network, e.g., part of a company's computer network.

When the coordinator 120 becomes overloaded (e.g., the log queue 124 is at or near capacity or a length of time between when one of the event logs 118 is generated and the coordinator 120 examines the event log satisfies a threshold), one (or more) of the agents is deputized to create a deputized agent 202. The coordinator 120 may rank each of the groups 130 in terms of a volume of event logs generated, or a rate of event logs generated (e.g., a number of event logs generated within a particular period of time) and then instruct the groups that are generating event logs at a rate (or volume) greater than a predetermined threshold to deputize an agent. For example, if the group 130(2) is generating the event logs 118(2) at a rate (or volume) that exceeds a predetermined threshold, then the coordinator 120 may instruct the group 130(2) to select a deputized agent. In this example, the agent 114(N) is selected as the deputized agent 202.

The agents 114(1) to 114(N) may communicate amongst themselves, e.g., with other agents in the group 130(2), to select the deputized agent 202, based on various criteria. For example, the criteria to select the deputized agent 202 may include an available processing capacity associated with the components 104(1) to 104(N) that are hosting each of the agents 114(1) to 114(N). For example, the agent 114(N) may be selected in part because the component 104(N) that is hosting the agent 114(N) has at least a threshold amount (e.g., 40%, 50%, 60% or the like) of available processing capacity. The criteria to select the deputized agent 202 may include an available storage capacity associated with the components 104(1) to 104(N) hosting the agents 114(1) to 114(N). The criteria may include a latency of the communication links 122(1) and 122(Q+1) between the components 104(1) to 104(N) hosting the agents 114(1) to 114(N) and the coordinator 120. In some cases, data used to select a deputized agent, such as each host component's processing capacity, each host component's storage capacity, latency between each host component and the central server 110, etc. may be periodically gathered from the agents 112, 114, 116 to enable each of the groups 130 to quickly select a deputized agent.

After the agent 114(N) is selected, the agent 114(N) may transition from a normal mode of operation to a deputized mode of operation, to become the deputized agent 202. The remaining agents in the group 130(2) may, instead of sending the logs 118(2) to the coordinator 120, send the logs 118(2) to the deputized agent 202 for storage in a local database 204 to create local logs 206 (e.g., locally stored logs). The coordinator 120 instructed the group 130(2) to select the deputized agent 202 because the group 130(2) is the highest producer of event logs in the computing system 200. By storing the event logs 118(2) in the local database 204, instead of sending the event logs 118(2) to the coordinator 120, the number of events logs sent to the coordinator 120 and stored in the log queue 124 may be significantly reduced, thereby alleviating the overload condition of the coordinator 120.

The deputized agent 202 may continue to perform actions that the agent 114(N) performed, in terms of monitoring the component 104(N) and generating event logs. However, rather than sending the event logs to the central server 110, the deputized agent 202 may store the event logs in the local database 204.

The deputized agent 202 may examine the local logs 206 in a manner similar to how the coordinator 120 examines the event logs in the log queue 124 and perform various actions. For example, the deputized agent 202 may analyze the local logs 206 and send one or more priority logs 208 to the coordinator 120. For example, the priority logs 208 may include high priority logs from the local logs 206. In addition, the priority logs 208 may include log data 210 associated with medium priority logs and low priority logs stored in the local logs 206, such as on how many event logs have been stored in the local database 204, statistics on the types of event logs in the local database 204, how many of each type of event log has been stored in the local database 204, and the like. The log data 210 may enable the coordinator 120 to determine which logs the coordinator 120 is not receiving. For example, if a system administrator submits a query to the coordinator 120 requesting to view a particular (e.g., low or medium priority) event log that is stored in the local logs 206, the coordinator 120 may determine (e.g., based on the log data 210) that the particular event log is stored in the local logs 206. The coordinator 120 may send a message to the deputized agent 202 requesting the particular event log. In response, the deputized agent 202 may retrieve the particular event log from the local logs 206 and send the particular event log to the coordinator 120 to enable the coordinator 120 to respond to the system administrator's query. In this way, a user, such as a system administrator, may be unaware of the presence of the deputized agent 202. Thus, the selection of the deputized agent 202 and the actions performed by the deputized agent 202 may be indiscernible (e.g., transparent) to users.

The data used to select a deputized agent, such as each host component's processing capacity, each host component's storage capacity, latency between each host component and the central server 110, etc., may be periodically gathered from the agents 112, 114, 116 to enable each of the groups 130 to quickly select a deputized agent. This data may be periodically (e.g., at a predetermined interval) from the agents to enable each of the groups 130 to quickly select a deputized agent based on the data. In addition, the data may be gathered over a period of time and analyzed (e.g., a weighted score may be determined for each agent based on the data) to determine which agents are candidates to be deputized agents.

When the coordinator 120 is overloaded, those of the components 102, 104, 106 hosting non-critical components may be given a lower priority to avoid disruptions to critical services, such as Exchange®, Active Directory®, and the like. For example, a lower priority may be assigned to those of the components 102, 104, 106 that are not time sensitive, such as tasks typically performed in the background. As another example, file system access events for non-critical files may be assigned a low priority because such events may generate a large number of non-critical event logs (e.g., file opened event logs, file closed event logs, etc.). As yet another example, SQL server auditing may be assigned a low priority if the hosted data is not of a critical nature. Many of the event logs 118 that are stored primarily for forensic purposes may be assigned a low priority and either discarded or stored locally by a deputized agent. In contrast, logins performed using Active Directory may be higher priority as the logins may be used to determine unauthorized accesses etc.

By analyzing the event logs 118 generated over a period of time (e.g., weeks, months, etc.), individual groups from the groups 130 that have a high likelihood of generating a large volume of event logs (e.g., thereby causing an overload condition) in the future, may be identified. For example, particular groups of the groups 130 may generate a high volume of event logs during certain times. To illustrate, at the beginning or end of each month (or quarter), users may run scripts to generate statistics (e.g., sales statistics, etc.) for the current or previous month (or quarter). Running these scripts may cause a large number of event logs to be generated by one or more groups. For example, the group 130(2) may include agents that monitor databases used to store sales statistics. Users may periodically execute scripts to determine sales statistics, causing the group 130(2) to generate a large number of event logs, causing the coordinator 120 to become overloaded.

Each of the groups 130 may be assigned a score based on a probability that the group may, at a future point in time, cause an overload condition for the coordinator 120. An agent with the criteria (e.g., hosted by a component with sufficient computing resources) to become a deputized agent may be identified for groups with a high likelihood of causing an overload. When the coordinator 120 becomes overloaded, the groups with higher likelihoods of causing the overload may be sent a request to appoint the previously identified agent as a deputized agent, e.g., without the group taking time and resources (e.g., exchanging messages) to identify the deputized agent. For example, in FIG. 2, the group 130(2) may include agents that monitor databases used to store sales statistics. Therefore, the group 130(2) may have a high likelihood of causing the coordinator 120 to become overloaded. When the coordinator 120 becomes overloaded, the coordinator 120 may instruct the group 130(2) to select a deputized agent. The deputized agent 202 may be an agent in the group 130(2) that is (1) not directly contributing to the increase in the event logs 118 and (2) hosted by the component 104(N) that has sufficient computing resources (e.g., processing power, local storage, fast communication link to the coordinator, etc.) to support the deputized agent 202.

The agents 112, 114, 116 may periodically "ping" (e.g., send a message to) the coordinator 120 and measure a response time, e.g., a period of time to receive a response from the coordinator 120. The response time may be measured by determining a length of time the coordinator 120 takes to process and respond to the ping message after the ping message is placed in the log queue 124. The "ping" may be viewed as a handshake communication that enables the agents 112, 114, 116 to determine to what extent the coordinator 120 is overloaded. For example, if the coordinator 120 does not respond to a "ping" message within a predetermined amount of time, an agent that sent the ping message may alert other agents in the same group or in other groups, causing the groups to select one or more deputized agents. The coordinator 120 may give a lower priority to responding to "ping" messages when the coordinator 120 is under heavy load (e.g., a large number of event logs were generated and stored in the log queue 124). In some cases, the coordinator 120 may preemptively instruct one or more of the groups 130 to select a deputized agent (or instruct one or more of the agents 112, 114, 116 to enter the deputized state). For example, a script may be scheduled to run at a predetermined time, e.g., to generate reports, perform maintenance, perform backups, etc., and the coordinator 120 preemptively instructs one or more of the groups 130 to select a deputized agent before the script is scheduled to be executed. In some cases, a particular agent in each of the groups 130 may choose to enter a deputized state when one or more of the agents in a particular group determine that a ping latency (e.g., a length of time for the coordinator 120 to respond to a "ping" message) exceeds a threshold.

When the agents 112, 114, 116 are divided into the groups 130, each of the agents 112, 114, 116 may be provided with information about the members (e.g., peer agents) in each group. For example, each of the agents 112(1) to 112(M) may be sent a message identifying the other agents in the group 130(1). In addition, the message may include information identifying which events are to be regarded as high priority (e.g., critically important) and are to be forwarded to the coordinator 120 and which event logs may be stored locally (e.g., without being forwarded). Thus, when an agent is deputized, each of the agents in the group may be capable of determining which type of event logs (e.g., high priority event logs) are to be forwarded to the coordinator 120 and which type of event logs (e.g., low or medium priority event logs) may be stored locally. In some cases, the agents in a group having a deputized agent may send event logs to the deputized agent and the deputized agent may determine which of the event logs received from the peer agents in the group to store locally and which of the event logs to forward to the coordinator 120. In other cases, each agent in a group having a deputized agent may determine which event logs to forward to the coordinator 120 and which event logs to send to the deputized agent, e.g., to avoid overloading the deputized agent. For example, agents in a group may send event logs with a high priority Active Directory event log class to the coordinator 120 but may send high or medium severity SQL Server events to the deputized agent of the group (e.g., rather than to the coordinator 120).

As previously mentioned, the coordinator 120 may send a message to each of the agents 112, 114, 116 identifying the groups 130 to which agent belongs and identifying the other (e.g., peer) agents in each group. During the process of grouping the agents 112, 114, 116 into the groups 130, the coordinator may determine host data (e.g., available processing power, available storage capacity etc.) associated with each agent's host component to determine which agents are potential candidates to (i) become a deputized agent, or (ii) to count "votes" from other agents within a group to determine which agent in the group to deputize. Agents may be grouped such that each group includes at least one agent that is hosted by a component that is capable of supporting a deputized agent. In addition, agents hosted on components that are considered critical, such as Active Directory domain controllers or Exchange® servers, may be spread out across the groups and may be identified as unsuitable candidates to be deputized.

When a particular group of the groups 130 determines a deputized agent, one of the agents (e.g., a selection agent 212) in the particular group may be selected to collect and tally "votes" from other agents. In some cases, each vote may indicate a determination by the agent that sent the vote as to whether the component hosting the agent has sufficient computing resources to support a deputized agent (e.g., a "me" or "not me" vote). Before grouping the agents 112, 114, 116, the coordinator 120 may have a list of agents in each group ordered based on suitability to become a selection agent to receive votes from other agents in the group. Each agent in a particular group may send a vote to the selection agent specified in the list associated with the particular group. In some cases, the selection agent may not become the deputized agent. For example, one of the agents 114(1) to 114(N) in the group 130(2) may be selected as the selection agent 212 and the remaining agents in the group 130(2) may send votes regarding each agent's suitability (e.g., to become the deputized agent) to the selection agent 212.

Thus, selecting an agent in a group to become the deputized agent (e.g., the deputized agent 202 of the group 130(2)) may be a dynamic process that is performed each time the coordinator 120 becomes overloaded. For example, at a first point in time, the component 104(N) may have a large amount of available capacity in the local database 204, resulting in the agent 114(N) being selected as the deputized agent 202. Later, at a second point in time, the local database 204 may have filled up and may have a much smaller available capacity, making the component 104(N) incapable of supporting a deputized agent. At the second point in time, the group 130(2) may select a different agent (e.g., an agent other than the agent 114(N)) to become the deputized agent 202.

A particular agent identified in the list as a selection agent (e.g., the selection agent 212) may message other agents in the group to let the other agents know if the particular agent can perform the operations of the selection agent. For example, if the particular agent lacks sufficient memory or bandwidth, the particular agent may indicate to the other agents in the group that the particular agent is incapable of becoming the selection agent. In response, the agents may move to a next agent identified in the list as suitable to be a selection.

After the selection agent (e.g., the selection agent 212) is selected in a group, each agent in the group may send information to the selection group as to whether the agent should be considered a candidate to become the deputized agent. For example, each agent of the agents in the group 130(2) may provide a vote as to whether the corresponding host component (e.g., of the host components 104(1) to 104(N)) is capable of supporting a deputized agent. The vote message may include information as to the host component's capabilities. For example, the agent 114(1) may send a vote message to the selection agent 212 indicating whether the component 104(1) is capable of supporting a deputized agent. The vote message may include criteria such as an available processing capacity of the component 104(1), an available storage capacity of the component 104(1), a message latency of ping messages sent from the component 104(1) to the coordinator 120, another type of criteria, or any combination thereof. The information provided in the vote message may be used to determine a weighted score for each agent in the group as to each agent's suitability to become the deputized agent.

The scoring of the criteria of an agent in a particular group may be compared to the scores of other agents in the particular group. To determine a weighted score for each agent's suitability to become the deputized agent, an ordered list associated with each criteria may be used. The values for each criteria may be a normalized ranked position of a particular agent relative to other agents in the group (e.g., the values may be inversed such that 1 represents a suitable candidate and 0 represents an unsuitable candidate). For example, an agent with the second best position for storage capacity in a group of ten agents may have a value of 0.8 (1−(2/10)=1−0.2=0.8).

As an example, of how a weighted score may be determined for each agent, the following calculations may be performed ("*" denotes multiplication and "+" denotes addition):

First Weight*[rank in group for storage capacity (e.g., available drive space)]
+
Second Weight*[rank in group for average peer latency]
(e.g., Latency of messages sent between peer agents in a same group)
+
Third Weight*[rank in group for processing capacity]
(e.g., Processing capacity may be determined based on processor speed, number of cores, capacity in millions of instructions per second (MIPS) based on one or more benchmarks, etc.)
+
Fourth Weight*[rank in group for average ping latency to the coordinator]
=Weighted Score The weights enable the score to be customized for individual enterprises. For example, some criteria may be more important in a first computing system while other criteria may be more important in a second computing system. A system administrator may adjust the weights based on the capabilities of the components in the computing system. The sum of the total score may be normalized to a sum of all weight multipliers to give a fractional score total that is between 0 and 1. The highest score among the scores determined for the agents in a group may be used to select an agent in the group to become the deputized agent. While the weighted score described above uses four criteria (e.g., storage capacity, processing capacity, peer agent latency, and ping latency), other implementations may use fewer than four criteria or more than four criteria.

Thus, when a coordinator hosted by a central server becomes overloaded due to the generation of a large volume of event logs, one or more groups in the computing system may select an agent to become a deputized agent. The deputized agent may be selected by determining a weighted score based on the rankings of each agent within each group with regard to various criteria (e.g., storage capacity, processing capacity, peer agent latency, and ping latency) associated with the agent's host component. The deputized agent may receive event logs generated by peer agents (e.g., other agents in the same group as the deputized agent) and store the event logs locally, e.g., in a storage media of a component that is hosting the deputized agent. The deputized agent may analyze the event logs generated by the peer agents and send (e.g., forward) event logs having a high priority (e.g., according to criteria provided by the coordinator) to the coordinator. The deputized agent may send information (e.g., statistics) associated with the lower priority event logs that are being stored locally to the coordinator. When the coordinator is no longer in an overloaded state, the coordinator may request the deputized agents in each group to send the locally stored logs to the coordinator. The coordinator may receive the logs that had been stored locally by the deputized agents and stored them in a central database.

Figure 3:
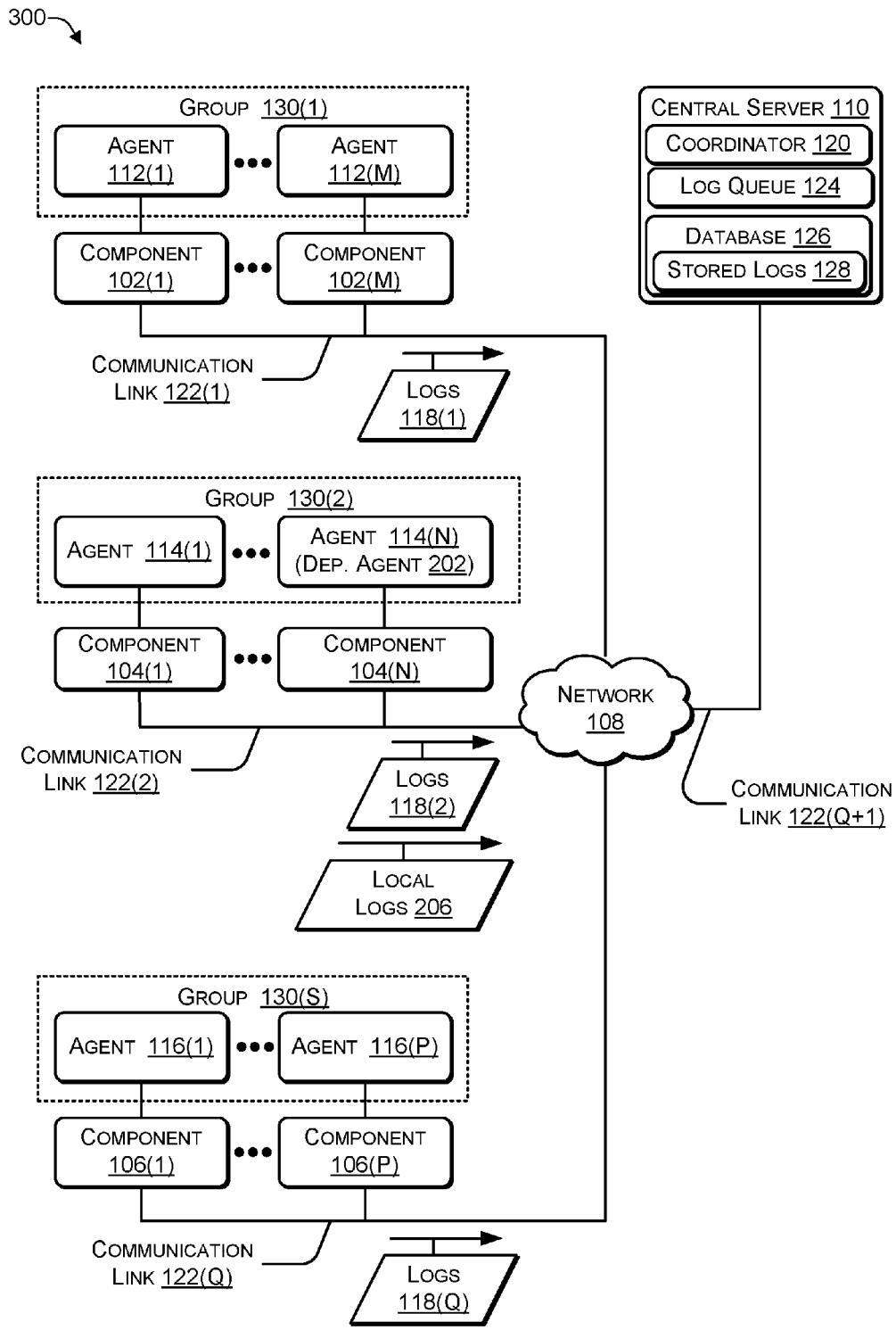
FIG. 3 is a block diagram illustrating a computing system that includes a previously deputized agent according to some examples.

FIG. 3 is a block diagram illustrating a computing system 300 that includes a previously deputized agent according to some examples. The computing system 300 may be at least a part of an enterprise network, e.g., part of a company's computer network.

When the coordinator 120 is no longer in an overload state, the coordinator 120 may determine which of the groups 130 appointed a deputized agent and send a request to the deputized agent(s) to send the locally stored event logs to the coordinator 120 for storage in the database 126. The deputized agent(s) may receive the request and transition from the deputized agent mode to the normal mode to resume performing the normal operations of the agent while no longer performing the operations of the deputized agent. For example, the coordinator 120 may determine that the group 130(2) appointed the agent 114(N) to act as the deputized agent 202 and send a request to the agent 114(N) to send the event logs 206 to the coordinator 120 for storage in the database 126. In response, the agent 114(N) may send the local logs 206 (e.g., that were stored in the local database 204) to the coordinator 120 and resume monitoring the component 104(N). The agents in the group 130(2) may resume sending the event logs 118(2) to the coordinator 120 (e.g., instead of to the deputized agent 202).

Figure 4:
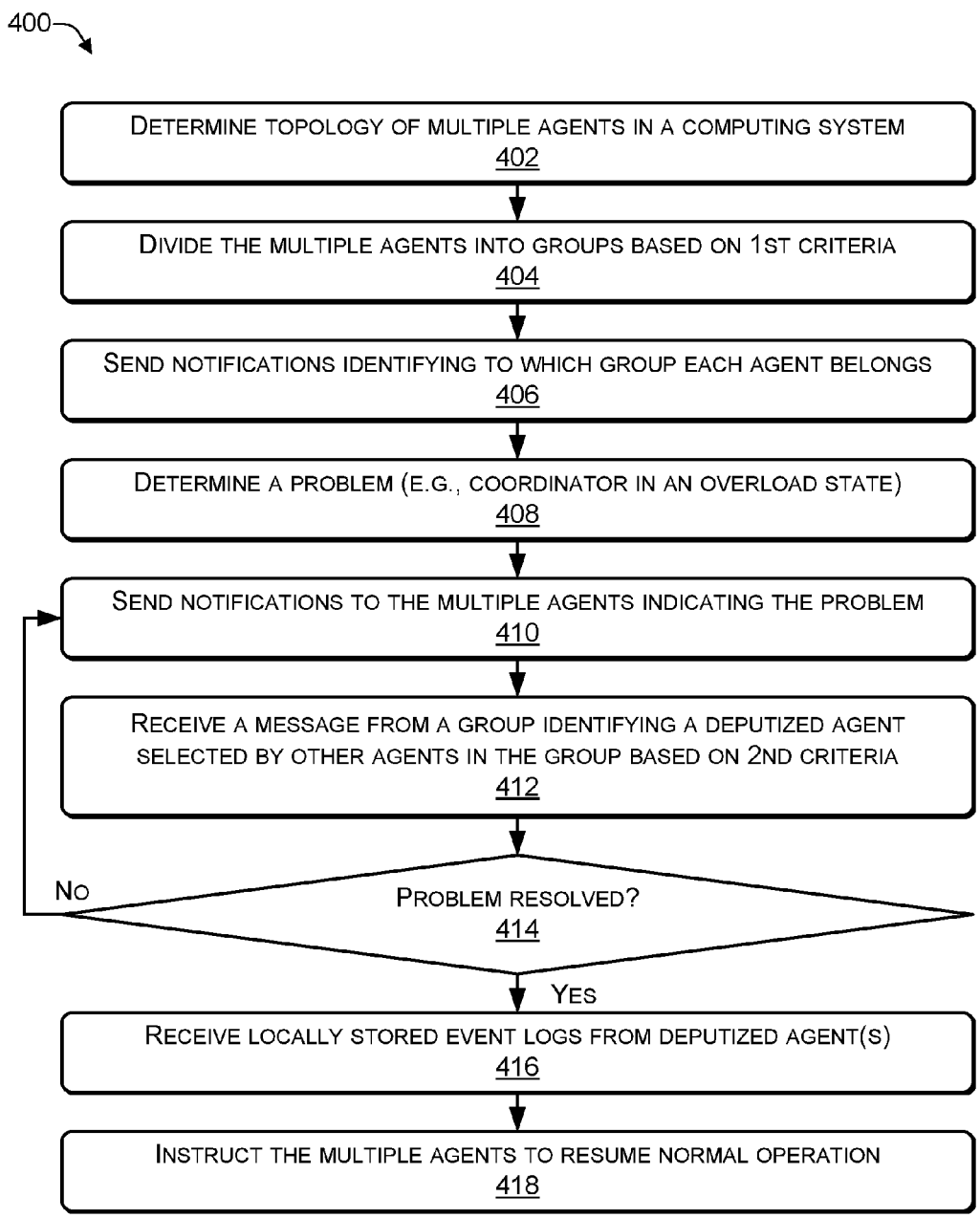
FIG. 4 is a flowchart of a process that includes grouping multiple agents according to some examples.
Figure 5:
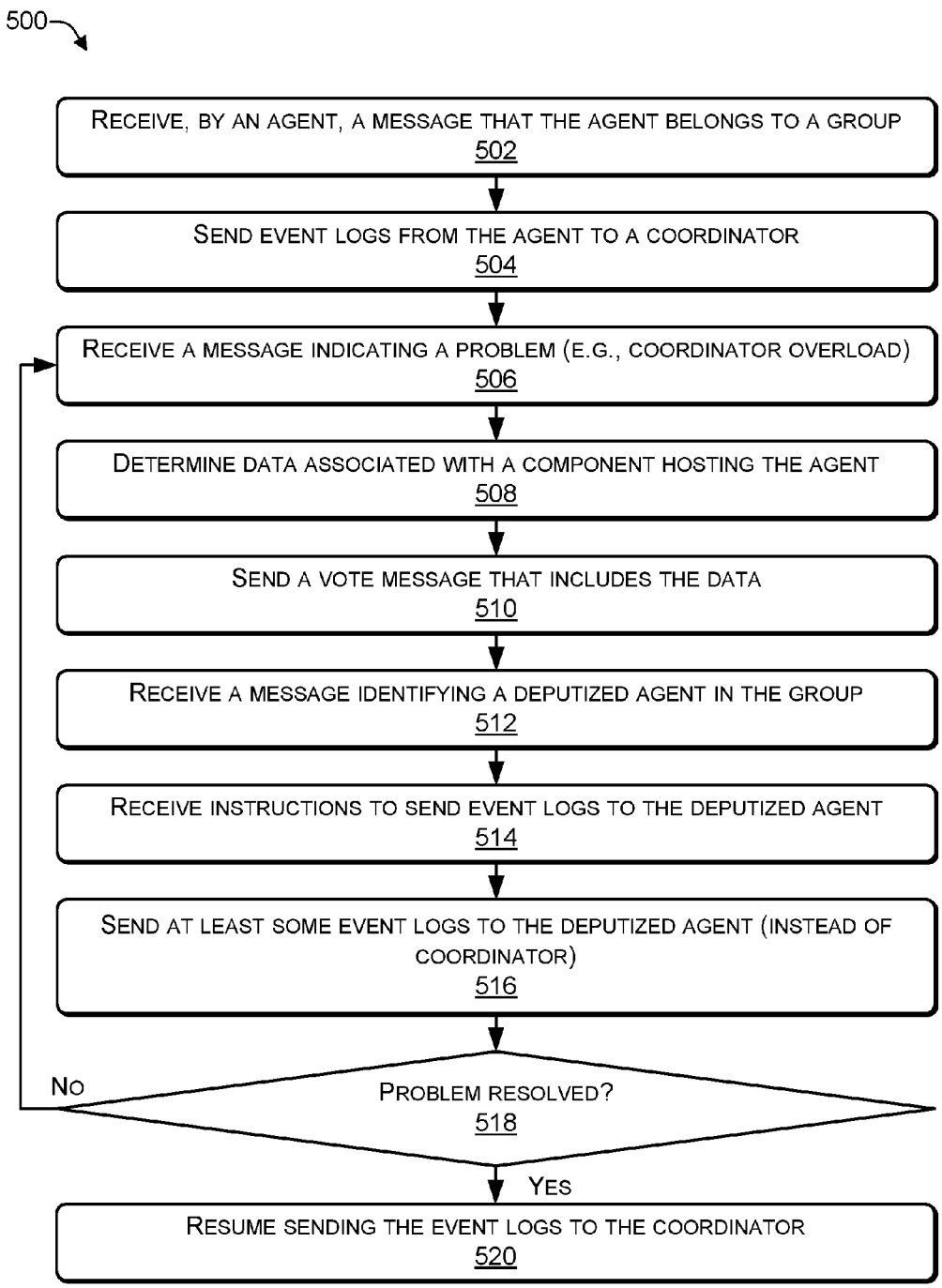
FIG. 5 is a flowchart of a process that includes identifying a deputized agent in a group according to some examples.
Figure 6:
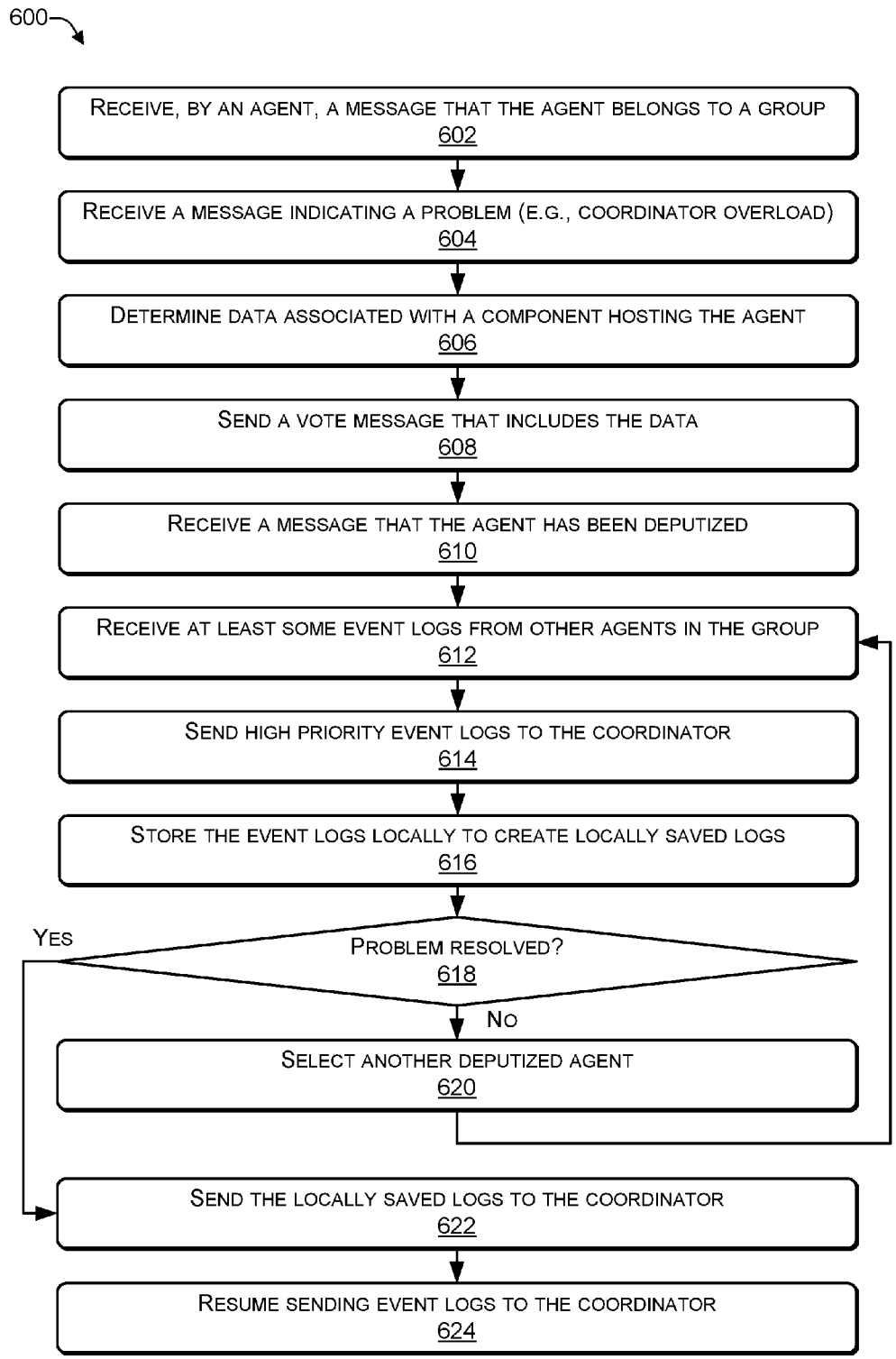
FIG. 6 is a flowchart of a process that includes storing logs received from other agents in a group according to some examples.

In the flow diagrams of FIGS. 4, 5, and 6, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400, 500, and 600 are described with reference to FIGS. 1, 2, and 3 as described above, although other models, frameworks, systems and environments may implement these processes.

FIG. 4 is a flowchart of a process 400 that includes grouping multiple agents according to some examples. For example, the process 400 may be performed by the coordinator 120 of FIGS. 1, 2, and 3.

At 402, a topology of multiple agents in a computing system may be determined. At 404, the multiple agents may be divided into groups based on first criteria. At 406, notifications may be sent identifying to which group each agent belongs. For example, in FIG. 1, the coordinator 120 may determine a topology of the agents 112, 114, 116 and divide the agents 112, 114, 116 into groups, such as the groups 130(1), 130(2), . . . 130(P). The coordinator 120 may send the agents 112, 114, 116 a message indicating to which group each agent belongs. For example, the coordinator 120 may send a message to the agents 112(1) to 112(M) indicating that each of the agents belongs to the group 130(1). For example, the first criteria may include a communication latency (e.g., a time taken between a sending agent sending a message and a recipient agent receiving the message) between agents in the group, an importance of services hosted by hardware components that host agents (e.g., agents hosted by components with critical or important services, such as Exchange® servers may not be included in a group or may not be grouped together), an amount of event logs generated over a particular period of time by each agent (e.g., to avoid grouping high-generating agents, e.g., agents that generate a large number of event logs, together), computing resources of the hardware components that host each agent (e.g., processing power, hard drive space, installed database components, and the like) to mix higher capability host components with lower capability host components in groups. Each agent may receive a message indicating group information, e.g., the group to which agent belongs, the identities of other agents in the group, etc., to enable each agent to contact peer agents within the group.

At 408, a problem (e.g., coordinator overload) may be determined. At 410, notifications may be sent to the multiple agents indicating the problem. At 412, a message may be received from a group identifying a deputized agent selected by other agents in the group based on second criteria. For example, in FIG. 1, one or more of the agents 112, 114, 116, or the coordinator 120 may determine that the coordinator 120 is in an overload state. To illustrate, each of the agents 112, 114, 116 may periodically send a "ping" message to the coordinator 120 and determine a latency, e.g., a time that the coordinator 120 takes to respond to the "ping" message. When the latency of the "ping" message satisfies a threshold, one of the agents 112, 114, 116 may determine that the coordinator 120 is overloaded and send a message alerting the other agents in the computing system. In some cases, the coordinator 120 may itself determine an overload condition and notify the agents 112, 114, 116. For example, the coordinator 120 may determine a latency to examine event logs stored in the log queue 124, e.g., a time between when the event log was generated (e.g., based on a timestamp included in the event log) and when the coordinator 120 retrieved the event log from the log queue 124. When the latency to examine an event log in the log queue 124 satisfies a threshold, the coordinator 120 may notify the agents 112, 114, 116 of an overload condition. The coordinator 120 may determine that an overload has occurred when an amount of space occupied by event logs in the log queue 124 satisfies a threshold or an amount of remaining space in the log queue 124 satisfies a threshold.

After the coordinator 120 or the agents 112, 114, 116 have determined that there is a problem (e.g., the coordinator 120 is overloaded), then one or more of the groups 130 may select an agent to become a deputized agent. For example, groups that are currently generating (or have historically generated) a large volume (or rate) of event logs may self-select or be notified to select a deputized agent. Each of the agents in a group may determine data associated with a component that is hosting the agent and send the data to the other agents in the group. The data may be ranked within the group and a weighted score determined for each component. Based on the weighted score, a component in the group that is capable of hosting a deputized agent may be selected. The agent hosted by the selected component may be instructed to become the deputized agent. For example, in FIG. 2, the coordinator 120 may receive a message from the deputized agent 202 or the selection agent 212 indicating that the agent 114(N) has been selected to be the deputized agent for the group 130(2).

At 414, a determination may be made whether the problem has been resolved. In response to determining, at 414, that the problem has not been resolved, the process may proceed to 410 where a notification may be sent to the multiple agents to select an additional deputized agent. After selecting a deputized agent, if the coordinator continues to experience overload, additional agents may be deputized until the coordinator is no longer overloaded. For example, in FIG. 2, the deputized agent 202 may be selected from the group 130(2) that is generating a highest number of event logs within a predetermined time period, a second deputized agent may be selected from a second group generating a next highest number of event logs within the predetermined time period, and so on, until the coordinator 120 is no longer overloaded. If a deputized agent experiences overload, the process of selecting a deputized agent may be recursively applied to the group to which the deputized agent belongs. For example, in FIG. 2, if the deputized agent 202 experiences overload, the group 130(2) may be sub-divided into multiple sub-groups. One or more of the sub-groups may select a second deputized agent. The second deputized agent may store event logs locally for one sub-group of the multiple sub-groups. This process may be repeated until each of the deputized agents do not encounter overload.

In response to determining, at 414, that the problem has been resolved, local stored event logs may be received from the deputized agents, at 416. At 418, the multiple agents may be instructed to resume normal operations. For example, in FIG. 3, after determining that the coordinator 120 is no longer overloaded, the coordinator 120 may instruct the agent 114(N) (e.g., formerly the deputized agent 202) to send the local logs 206 to the central server 110.

Thus, a coordinator may divide multiple agents in a computing system into groups based on various criteria. When the coordinator encounters overload, in some cases, the coordinator may instruct the groups ranked as producing a highest amount of event logs to select a deputized agent. In some cases, the agents in a group that is historically identified as producing a large volume (or rate) of event logs may determine that the coordinator is overloaded (e.g., based on a latency of a "ping" message) and automatically select a deputized agent. If the coordinator continues to experience overload, the coordinator may instruct one or more additional groups to select a deputized agent. If a deputized agent experiences overload, the process of selecting a deputized agent may be recursively applied to agents in the group by dividing the agents in the group into multiple sub-groups and instructing one or more of the sub-groups to select a deputized agent. When the coordinator is no longer overloaded, the coordinator may instruct the deputized agents to send the locally stored event logs to the central server for storage.

FIG. 5 is a flowchart of a process 500 that includes identifying a deputized agent in a group according to some examples. For example, the process 500 may be performed by one or more of the agents 112, 114, 116 of FIGS. 1, 2, and 3.

At 502, a message (e.g., from a coordinator) may be received by an agent identifying a group to which the agent belongs. At 504, the agent may send event logs to a coordinator. For example, in FIG. 1, the coordinator 120 may send each of the agents 112, 114, 116 a message indicating to which group each agent belongs. For example, the coordinator 120 may send a message to the agents 112(1) to 112(M) indicating that each of the agents belongs to the group 130(1). The agents 112 may send the logs 118(1) to the coordinator 120, the agents 114 may send the logs 118(2) to the coordinator 120, and the agents 116 may send the logs 118(Q) to the coordinator 120.

At 506, a message indicating a problem (e.g., coordinator overload) may be received by the agent (e.g., from the coordinator or from another agent). At 508, the agent may determine data associated with a component that is hosting the agent. At 510, the agent may send (e.g., to a selection agent) a vote message that includes the data. At 512, the agent may receive a message (e.g., from the selection agent) identifying the deputized agent in the group. For example, in FIG. 1, one or more of the agents 112, 114, 116 may determine that the coordinator 120 is in an overload state based on latency of a "ping" message to the coordinator 120. In some cases, the coordinator 120 may itself determine the overload condition and notify the agents 112, 114, 116. For example, the coordinator 120 may determine the overload based on (1) a latency to examine event logs stored in the log queue 124, (2) when an amount of space occupied by event logs in the log queue 124 satisfies a threshold, or (3) when an amount of remaining space in the log queue 124 satisfies a threshold. In response to determining that the coordinator 120 is overloaded, one or more of the groups 130 may select a deputized agent. For example, in FIG. 2, each agent in the group 130(2) may determine data (e.g., processing capacity, storage capacity, inter-agent latency, and agent-coordinator latency) associated with the components 104(1) to 104(N). Each agent may send a vote message (e.g., indicating whether or not the agent's hosting component is suitable to host a deputized agent) and the data to the selection agent 212. The selection agent 212 may determine rankings (e.g., in the group 130(2)) for each criteria and then determine a weighted score for each agent that voted itself as a candidate to be the deputized agent. The agents in the group 130(2) may be notified that the agent 114(N) of FIG. 1 has been selected to be the deputized agent 202 based on the weighted scores.

At 514, the agent may receive instructions to send event logs to the deputized agent. At 516, the agent may send at least some event logs to the deputized agent (e.g., instead of the coordinator). For example, in FIG. 2, the agent 114(1) may send the event logs 118(2) to the deputized agent 202, instead of the coordinator 120. In some cases, as discussed above, the agent 114(1) may send high priority event logs to the coordinator 120 while sending lower priority event logs to the deputized agent 202.

At 518, a determination may be made whether the problem has been resolved. In response to determining, at 520, that the problem has not been resolved, the process may proceed to 506 where the agent may receive a notification that there is a problem, to initiate selection of an additional deputized agent. After selecting a deputized agent, if the coordinator continues to experience overload (e.g., as determined by the coordinator or by an agent), additional agents may be deputized until the coordinator is no longer overloaded. For example, in FIG. 2, the deputized agent 202 may be selected from the group 130(2) that is generating a highest number of event logs within a predetermined time period, a second deputized agent may be selected from a second group generating a next highest number of event logs within the predetermined time period, and so on, until the coordinator 120 is no longer overloaded. If a deputized agent experiences overload, the process of selecting a deputized agent may be recursively applied to the group to which the deputized agent belongs. For example, in FIG. 2, if the deputized agent 202 experiences overload, the group 130(2) may be sub-divided into multiple sub-groups. One or more of the sub-groups may select a second deputized agent. The second deputized agent may store event logs locally for one sub-group of the multiple sub-groups. This process may be repeated until each of the deputized agents do not encounter overload.

In response to determining, at 518, that the problem has been resolved, the agent may be instructed to resume normal operations (e.g., transition from a deputized agent mode to a normal mode of operation) by sending event logs to the coordinator, at 520. For example, in FIG. 3, after determining that the coordinator 120 is no longer overloaded, the coordinator 120 may instruct the agents in the group 130(2) to send the event logs 118(2), generated by the agents 114(1) to 114(N), to the central server 110.

Thus, an agent deployed in a computing system may receive a message indicating that the agent belongs to a group and identifying other agents in the group. The agent may send event logs to a coordinator. After the agent receives a message (e.g., from the coordinator or another agent) that the coordinator has become overloaded, the agent, along with other agents in the agent's group, may select an agent in the group to become a deputized agent. After selecting a deputized agent, the agent (and other agents in the group) may send event logs to the deputized agent instead of sending the event logs to the coordinator. After the coordinator is determined not to be overloaded, the agent may resume sending event logs to the coordinator (e.g., instead of to the deputized agent).

FIG. 6 is a flowchart of a process 600 that includes storing logs received from other agents in a group according to some examples. For example, the process 600 may be performed by an agent selected to be (e.g., perform the operations of) a deputized agent, as the agent 114(N) of FIGS. 1, 2, and 3.

At 602, a message (e.g., from a coordinator) may be received by an agent identifying a group to which the agent belongs. For example, in FIG. 1, the coordinator 120 may send each of the agents 112, 114, 116 a message indicating to which group each agent belongs. For example, the coordinator 120 may send a message to the agents 112(1) to 112(M) indicating that each of the agents belongs to the group 130(1). The agents 112 may send the logs 118(1) to the coordinator 120, the agents 114 may send the logs 118(2) to the coordinator 120, and the agents 116 may send the logs 118(Q) to the coordinator 120.

At 604, a message indicating a problem (e.g., coordinator overload) may be received by the agent (e.g., from the coordinator or from another agent). At 606, the agent may determine data associated with a component that is hosting the agent. At 608, the agent may send (e.g., to a selection agent) a vote message that includes the data. At 610, the agent may receive a message (e.g., from the selection agent) identifying the agent as the deputized agent in the group. For example, in FIG. 1, one or more of the agents 112, 114, 116 may determine that the coordinator 120 is in an overload state based on latency of a "ping" message to the coordinator 120. In some cases, the coordinator 120 may itself determine the overload condition and notify the agents 112, 114, 116. For example, the coordinator 120 may determine the overload based on (1) a latency to examine event logs stored in the log queue 124, (2) when an amount of space occupied by event logs in the log queue 124 satisfies a threshold, or (3) when an amount of remaining space in the log queue 124 satisfies a threshold. In response to determining that the coordinator 120 is overloaded, one or more of the groups 130 may select a deputized agent. For example, in FIG. 2, each agent in the group 130(2) may determine data (e.g., processing capacity, storage capacity, inter-agent latency, and agent-coordinator latency) associated with the components 104(1) to 104(N). Each agent may send a vote message (e.g., indicating whether or not the agent's hosting component is suitable to host a deputized agent) and the data to the selection agent 212. The selection agent 212 may determine rankings (e.g., in the group 130(2)) for each criteria and then determine a weighted score for each agent that voted itself as a candidate to be the deputized agent. The agent 114(N) of FIG. 1 may receive a message from the selection agent 212 indicating that the agent 114(N) has been selected to be the deputized agent 202 for the group 130(2).

At 612, the deputized agent may receive at least some event logs from other agents (e.g., peer agents) in the group. At 614, the deputized agent may examine the event logs and forward high priority event logs to the coordinator. At 616, the deputized agent may store the event logs in a local storage (e.g., local to the component hosting the deputized agent). For example, in FIG. 2, the agent 114(1) may send the event logs 118(2) to the deputized agent 202, instead of the coordinator 120. In some cases, as discussed above, the agent 114(1) may send high priority event logs to the coordinator 120 while sending lower priority event logs to the deputized agent 202. The deputized agent 202 may examine the event logs 118(2) and send priority logs 208 from the event logs 118(2) to the coordinator 120. The deputized agent may store the event logs 118(2) in the local database 204 to create the local logs 206.

At 618, a determination may be made whether the problem has been resolved. In response to determining, at 618, that the problem has not been resolved, the process may proceed to 620, where an additional deputized agent may be selected, and then proceed to 612. After selecting a deputized agent, if the coordinator continues to experience overload (e.g., as determined by the coordinator or by an agent), additional agents may be deputized until the coordinator is no longer overloaded. For example, in FIG. 2, the deputized agent 202 may be selected from the group 130(2) that is generating a highest number of event logs within a predetermined time period, a second deputized agent may be selected from a second group generating a next highest number of event logs within the predetermined time period, and so on, until the coordinator 120 is no longer overloaded. If a deputized agent experiences overload, the process of selecting a deputized agent may be recursively applied to the group to which the deputized agent belongs. For example, in FIG. 2, if the deputized agent 202 experiences overload, the group 130(2) may be sub-divided into multiple sub-groups. One or more of the sub-groups may select a second deputized agent. The second deputized agent may store event logs locally for one sub-group of the multiple sub-groups. This process may be repeated until each of the deputized agents do not encounter overload.

In response to determining, at 618, that the problem has been resolved, the deputized agent may be instructed to resume normal operations by sending the locally saved logs to the coordinator, at 622, and resuming sending event logs to the coordinator, at 624. For example, in FIG. 3, after determining that the coordinator 120 is no longer overloaded, the agent 114(N) may send the local logs 206 to the coordinator 120 and send the event logs 118(2) to the coordinator 120.

Thus, an agent deployed in a computing system may receive a message indicating that the agent belongs to a group and identifying other agents in the group. The agent may send event logs to a coordinator. After the agent receives a message (e.g., from the coordinator or another agent) that the coordinator has become overloaded, the agent, along with other agents in the agent's group, may select the agent to become a deputized agent for the group. The other agents in the group may send event logs to the deputized agent. The deputized agent may receive the event logs from the other agents, examine the event logs, send high priority event logs to the coordinator, and store the event logs in local storage. After the coordinator is determined not to be overloaded, the deputized agent may send the locally stored event logs to the coordinator and resume sending event logs to the coordinator.

Figure 7:
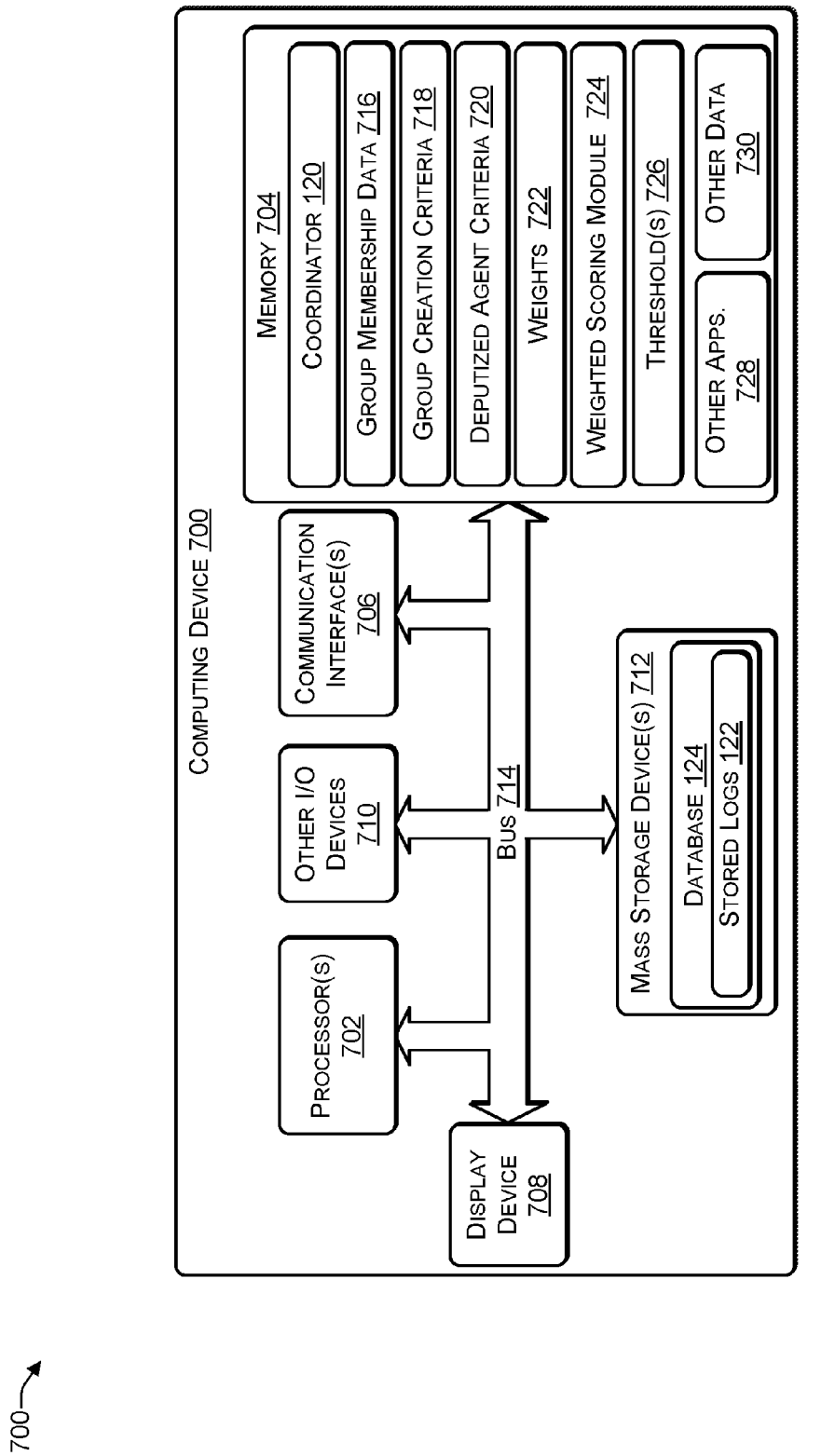
FIG. 7 illustrates an example configuration of a computing device that can be used to implement the systems and techniques described herein.

FIG. 7 illustrates an example configuration of a computing device 700 that can be used to implement the systems and techniques described herein, such as the central server 110 or the components 102, 104, 106 of FIGS. 1, 2, and 3. The computing device 700 may include one or more processors 702, a memory 704, communication interfaces 706, a display device 708, other input/output (I/O) devices 710, and one or more mass storage devices 712, configured to communicate with each other, such as via a system bus 714 or other suitable connection.

The processor 702 is a hardware device (e.g., an integrated circuit) that may include one or more processing units, at least some of which may include single or multiple computing units or multiple cores. The processor 702 can be implemented as one or more hardware devices, such as microprocessors, microcomputers, microcontrollers, digital signal processors, central processing units, state machines, logic circuitries, and/or any devices that manipulate signals based on executing operational instructions. Among other capabilities, the processor 702 can be configured to fetch and execute computer-readable instructions stored in the memory 704, mass storage devices 712, or other computer-readable media.

Memory 704 and mass storage devices 712 are examples of computer storage media (e.g., memory storage devices) for storing instructions which are executed by the processor 702 to perform the various functions described above. For example, memory 704 may generally include both volatile memory and non-volatile memory (e.g., RAM, ROM, or the like) devices. Further, mass storage devices 712 may include hard disk drives, solid-state drives, removable media, including external and removable drives, memory cards, flash memory, floppy disks, optical disks (e.g., CD, DVD), a storage array, a network attached storage, a storage area network, or the like. Both memory 704 and mass storage devices 712 may be collectively referred to as memory or computer storage media herein, and may be a media capable of storing computer-readable, processor-executable program instructions as computer program code that can be executed by the processor 702 as a particular machine configured for carrying out the operations and functions described in the implementations herein.

The computing device 700 may also include one or more communication interfaces 706 for exchanging data (e.g., via the network 108 of FIG. 1). The communication interfaces 706 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet, and the like. Communication interfaces 706 can also provide communication with external storage (not shown), such as in a storage array, network attached storage, storage area network, or the like.

A display device 708, such as a monitor may be included in some implementations for displaying information and images to users. Other I/O devices 710 may be devices that receive various inputs from a user and provide various outputs to the user, and may include a keyboard, a remote controller, a mouse, a printer, audio input/output devices, and so forth.

The computer storage media, such as memory 704 and mass storage devices 712, may be used to store software and data. For example, the computer storage media may be used to store software applications, such as the coordinator 120 and weighted scoring module 724 and data, such as group member ship data 716, group creation criteria 718, deputized agent criteria 720, weights 722, thresholds 726, other applications 728, and other data 730. The weighted scoring module 724 may use the weights 722 with the data associated with components to determine weighted scores for each component in a group to enable a component that is capable of hosting a deputized agent to be selected. For example, in a particular implementation, the weighted scores for each component may be determined as follows. Weighted score= (W1× Storage Capacity ranking)+(W2× Processing Capacity ranking)+(W3× peer latency ranking)+(W4× ping latency ranking), where the weights 722 include W1, W2, W3, and W4.

The group creation criteria 718 may include criteria used to group a set of agents into a group, such as, for example, a communication latency between agents in a group, an importance of services hosted by hardware components that host agents (e.g., agents hosted by components with critical or important services, such as Exchange® servers may not be included in a group or may not be grouped together), an amount of event logs generated over a particular period of time by each agent (e.g., to avoid grouping high-generating agents, e.g., agents that generate a large number of event logs, together), computing resources of the hardware components that host each agent (e.g., processing power, hard drive space, installed database components, and the like) to mix higher capability host components with lower capability host components in groups. The deputized agent criteria may include a storage capacity of a component hosting an agent, the processing capacity of the component, the latency between the component and other components, and the ping latency between the component and the coordinator. The thresholds 726 may include the various thresholds described herein, including a latency threshold between a timestamp of an event log and when the coordinator examines the event log, a threshold number of event logs in the log queue (e.g., when exceeded, the coordinator is considered to be overloaded), a threshold capacity of the log queue (e.g., when exceeded, the coordinator is considered to be overloaded) and the like. The other applications 728 may include other software functions, applications, and modules described herein. The other data 730 may include messages, intermediate data, and other types of data as described herein.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, and can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Software modules include one or more of applications, bytecode, computer programs, executable files, computer-executable instructions, program modules, code expressed as source code in a high-level programming language such as C, C++, Perl, or other, a low-level programming code such as machine code, etc. An example software module is a basic input/output system (BIOS) file. A software module may include an application programming interface (API), a dynamic-link library (DLL) file, an executable (e.g., .exe) file, firmware, and so forth.

Processes described herein may be illustrated as a collection of blocks in a logical flow graph, which represent a sequence of operations that can be implemented in hardware, software, or a combination thereof. In the context of software, the blocks represent computer-executable instructions that are executable by one or more processors to perform the recited operations. The order in which the operations are described or depicted in the flow graph is not intended to be construed as a limitation. Also, one or more of the described blocks may be omitted without departing from the scope of the present disclosure.

Although various examples of the method and apparatus of the present disclosure have been illustrated herein in the Drawings and described in the Detailed Description, it will be understood that the disclosure is not limited to the examples disclosed, and is capable of numerous rearrangements, modifications and substitutions without departing from the scope of the present disclosure.

What is claimed is:

1. A computer-implemented method, comprising:
   receiving, by an agent, a request to select a deputized agent in a group of agents;
   determining data associated with a hardware component that is hosting the agent;
   sending the data to a selection agent in the group;
   receiving a message from the selection agent indicating that the agent has been deputized;
   transitioning from a normal mode of operation to a deputized mode of operation;
   receiving one or more event logs from other agents in the group;
   determining that at least one event log of the one or more event logs has a high priority;
   sending the at least one event log having the high priority to the coordinator; and
   storing the one or more event logs in a storage device accessible to the hardware component.

2. The computer-implemented method of claim 1, wherein determining the data associated with the hardware component that is hosting the agent comprises:
   determining a processing power of the hardware component in terms of millions of instructions per second (MIPS); and
   determining a storage capacity of the storage device that is accessible to the hardware component.

3. The computer-implemented method of claim 1, wherein determining the data associated with the hardware component that is hosting the agent comprises:
   determining an average inter-group communications latency of a first plurality of messages received by the agent from the other agents in the group; and
   determining an average ping message latency associated with a second plurality of messages between the agent and the coordinator.

4. The computer-implemented method of claim 1, further comprising:
   receiving, by the agent, a group information message from the coordinator indicating that the agent belongs to a group and identifying the other agents in the group.

5. The computer-implemented method of claim 1, further comprising:
   monitoring, by the agent, a hardware component in a computing system;
   determining, by the agent, that an event associated with the hardware component occurred; and
   generating, by the agent, an event log based on the event.

6. The computer-implemented method of claim 1, further comprising:
   determining statistics associated with the one or more event logs stored in the storage device, the statistics including a number of event logs stored in the storage device; and
   sending the statistics to the coordinator.

7. The computer-implemented method of claim 1, further comprising:
   receiving a resume message from the coordinator;
   transitioning from the deputized mode of operation to the normal mode of operation;
   sending the one or more event logs stored in the storage device to the coordinator; and
   sending a newly generated event log to the coordinator.

8. One or more non-transitory computer-readable media storing instructions that are executable by one or more processors to perform operations comprising:
   receiving, by an agent, a request to select a deputized agent in a group of agents;
   determining data associated with a hardware component that is hosting the agent;
   sending the data to a selection agent in the group;
   receiving a message from the selection agent indicating that the agent has been deputized;
   transitioning from a normal mode of operation to a deputized mode of operation;
   receiving one or more event logs from other agents in the group;
   determining that at least one event log of the one or more event logs has a high priority;
   sending the at least one event log having the high priority to the coordinator; and
   storing the one or more event logs in a storage device accessible to the hardware component.

9. The one or more non-transitory computer-readable media of claim 8, wherein determining the data associated with the hardware component that is hosting the agent comprises:
   determining a processing power of the hardware component in terms of millions of instructions per second (MIPS); and
   determining a storage capacity of the storage device that is accessible to the hardware component.

10. The one or more non-transitory computer-readable media of claim 8, wherein determining the data associated with the hardware component that is hosting the agent comprises:
    determining an average inter-group communications latency of a first plurality of messages received by the agent from the other agents in the group; and
    determining an average ping message latency associated with a second plurality of messages between the agent and the coordinator.

11. The one or more non-transitory computer-readable media of claim 8, the operations further comprising:
receiving, by the agent, a group information message from the coordinator indicating that the agent belongs to a group and identifying the other agents in the group.

12. The one or more non-transitory computer-readable media of claim 8, the operations further comprising:
determining statistics associated with the one or more event logs stored in the storage device, the statistics including a number of event logs stored in the storage device; and
sending the statistics to the coordinator.

13. The one or more non-transitory computer-readable media of claim 8, further comprising:
receiving a resume message from the coordinator;
transitioning from the deputized mode of operation to the normal mode of operation;
sending the one or more event logs stored in the storage device to the coordinator; and
sending a newly generated event log to the coordinator.

14. A server comprising:
one or more processors; and
one or more non-transitory computer-readable media storing instructions that are executable by the one or more processors to:
receiving, by an agent executing on the server, a request to select a deputized agent in a group of agents;
determining data associated with the server;
sending the data to a selection agent in the group;
receiving a message from the selection agent indicating that the agent has been deputized;
transitioning from a normal mode of operation to a deputized mode of operation;
receiving one or more event logs from other agents in the group;
determining that at least one event log of the one or more event logs has a high priority;
sending the at least one event log having the high priority to the coordinator; and
storing the one or more event logs in a storage device accessible to the server.

15. The server of claim 14, wherein determining the data associated with the server comprises:
determining a processing power of the server in terms of a clock speed and a number of cores; and
determining a storage capacity of the storage device that is accessible to the server.

16. The server of claim 14, wherein determining the data associated with the server comprises:
determining an average inter-group communications latency of a first plurality of messages received by the agent from the other agents in the group; and
determining an average ping message latency associated with a second plurality of messages between the agent and the coordinator.

17. The server of claim 14, the operations further comprising:
receiving, by the agent, a group information message from the coordinator indicating that the agent belongs to a group and identifying the other agents in the group.

18. The server of claim 14, the operations further comprising:
determining statistics associated with the one or more event logs stored in the storage device, the statistics including a number of event logs stored in the storage device; and
sending the statistics to the coordinator.

19. The server of claim 14, further comprising:
receiving a resume message from the coordinator;
transitioning from the deputized mode of operation to the normal mode of operation;
sending the one or more event logs stored in the storage device to the coordinator; and
sending a newly generated event log to the coordinator.

20. The server of claim 14, further comprising:
determining statistics associated with the one or more event logs stored in the storage device, the statistics including a type of each of the event logs stored in the storage device and a number of event logs of each type stored in the storage device; and
sending the statistics to the coordinator.

* * * * *